United States Patent
Pavlov et al.

(10) Patent No.: US 10,337,335 B2
(45) Date of Patent: Jul. 2, 2019

(54) METHOD FOR MANUFACTURING A METALLIC OR CERAMIC COMPONENT BY SELECTIVE LASER MELTING ADDITIVE MANUFACTURING

(71) Applicant: ALSTOM Technology Ltd, Baden (CH)

(72) Inventors: Mikhail Pavlov, Dietikon (CH); Matthias Hoebel, Windisch (CH); Felix Roerig, Baden (CH); Julius Schurb, Zürich (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 595 days.

(21) Appl. No.: 14/592,182

(22) Filed: Jan. 8, 2015

(65) Prior Publication Data
US 2015/0198052 A1    Jul. 16, 2015

(30) Foreign Application Priority Data

Jan. 14, 2014  (EP) ..................... 14151178

(51) Int. Cl.
*B22F 3/105* (2006.01)
*F01D 5/28* (2006.01)
(Continued)

(52) U.S. Cl.
CPC ............ *F01D 5/284* (2013.01); *B22F 3/1055* (2013.01); *B22F 5/009* (2013.01); *B22F 5/04* (2013.01); *B23K 26/082* (2015.10); *B23K 26/32* (2013.01); *B23K 26/342* (2015.10); *B28B 1/001* (2013.01); *C04B 35/64* (2013.01); *C04B 35/653* (2013.01); *F01D 25/005* (2013.01); *F23R 3/002* (2013.01); *B22F 2003/1057* (2013.01); *B23K 2201/001* (2013.01); *B23K 2203/02* (2013.01); *B23K 2203/26* (2015.10); *B23K 2203/50* (2015.10); *B23K 2203/52* (2015.10); *B33Y 10/00* (2014.12); *B33Y 80/00* (2014.12); *C04B 2235/665* (2013.01); *C22C 32/0026* (2013.01);
(Continued)

(58) Field of Classification Search
None
See application file for complete search history.

(56) References Cited

U.S. PATENT DOCUMENTS

2011/0311389 A1   12/2011  Ryan et al.
2012/0267347 A1   10/2012  Arjakine et al.
(Continued)

*Primary Examiner* — Jessee R Roe
*Assistant Examiner* — Ngoclan T Mai
(74) *Attorney, Agent, or Firm* — Armstrong Teasdale LLP

(57) ABSTRACT

The invention refers to a method for selective laser melting additive manufacturing a three-dimensional metallic or ceramic article/component entirely or partly. The method includes successively building up said article/component layer by layer directly from a powder bed of a metallic or ceramic base material by means of remelting the layers with a high energy laser beam, moving repetitively across the areas, which are to be solidified. The movement of the laser beam is made of a superposition of a continuous linear movement and at least one superimposed oscillation with a determined frequency and amplitude. The oscillation is created by a beam deflection device and the same beam deflection device is also used for linear positioning movement.

17 Claims, 5 Drawing Sheets

(51) Int. Cl.

| | | |
|---|---|---|
| *B22F 5/00* | (2006.01) | |
| *B22F 5/04* | (2006.01) | |
| *C04B 35/64* | (2006.01) | |
| *B28B 1/00* | (2006.01) | |
| *F01D 25/00* | (2006.01) | |
| *F23R 3/00* | (2006.01) | |
| *B23K 26/32* | (2014.01) | |
| *B23K 26/342* | (2014.01) | |
| *B23K 26/082* | (2014.01) | |
| *C04B 35/653* | (2006.01) | |
| *C22C 32/00* | (2006.01) | |
| *B33Y 10/00* | (2015.01) | |
| *B33Y 80/00* | (2015.01) | |
| *B23K 101/00* | (2006.01) | |
| *B23K 103/00* | (2006.01) | |
| *B23K 103/02* | (2006.01) | |
| *B23K 103/18* | (2006.01) | |

(52) U.S. Cl.
CPC .............................. *F05D 2230/31* (2013.01); *F23R 2900/00018* (2013.01); *Y02P 10/295* (2015.11)

(56) References Cited

U.S. PATENT DOCUMENTS

2013/0216836 A1* 8/2013 Grebe .................. B22F 3/1055
428/411.1
2013/0263977 A1 10/2013 Rickenbacher et al.

* cited by examiner

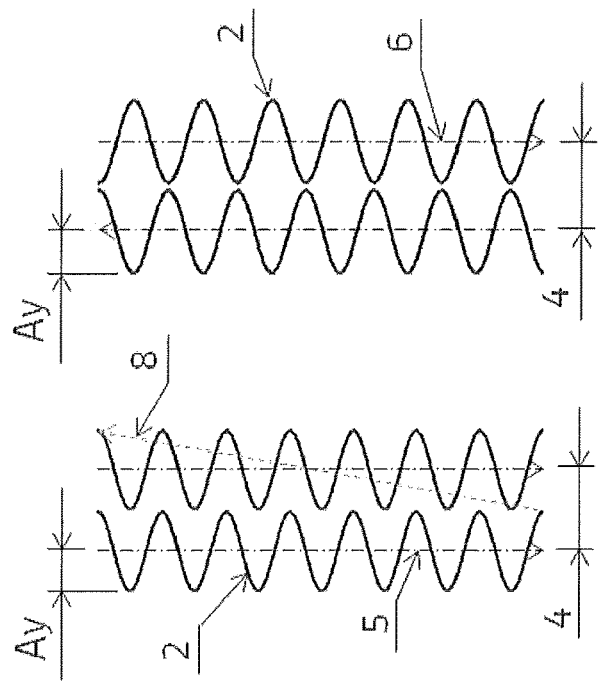
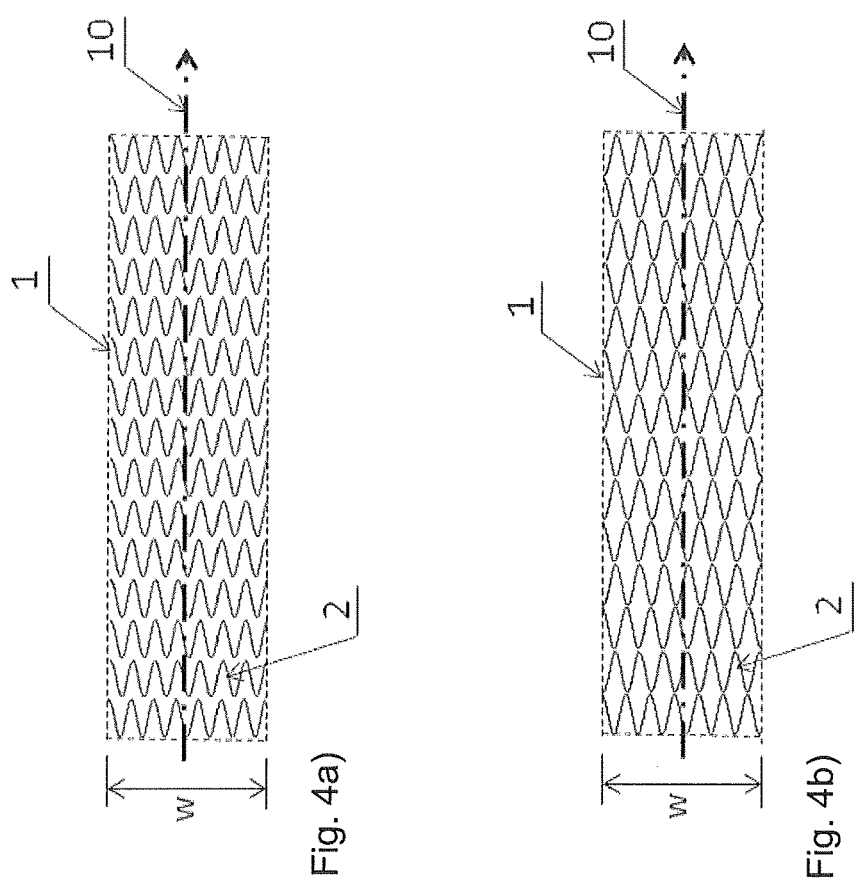

METHOD FOR MANUFACTURING A METALLIC OR CERAMIC COMPONENT BY SELECTIVE LASER MELTING ADDITIVE MANUFACTURING

CROSS-REFERENCE TO RELATED APPLICATIONS

This application claims priority to European application 14151178.2 filed Jan. 14, 2014, the contents of which are hereby incorporated in its entirety.

TECHNICAL FIELD

The present invention relates to the technology of high-temperature resistant components, especially hot gas path components for gas turbines. It refers to a method for manufacturing a metallic or ceramic component/three-dimensional article by selective laser melting (SLM) additive manufacturing technology.

BACKGROUND

Additive manufacturing has become a more and more attractive solution for the manufacturing of metallic or ceramic functional prototypes and components. For example, SLM and SEBM (selective electron beam melting) methods use powder material as base material. The powder is molten by laser or electron beam. According to a CAD model there is a powder layer deposition and the desired object is built on a platform. That means the component or article is generated directly from a powder bed by a layer wise manufacturing.

Conventional scanning strategies, as they are applied in all SLM machines nowadays, use centro-symmetrical laser spot configurations providing uniform irradiation conditions in all scanning directions. Melting of powder material is realized by (often at least partially overlapping) parallel laser passes, so-called tracks. During the additive manufacturing process, powder in the selected area where subjected to laser radiation is molten into the desired cross section of the part.

On one side, the production rate of the process is determined by the powder melting parameters: Power of the energy beam, scanning speed, hatch distance, spot size. To ensure, that powder will be irradiated with an equal amount of laser radiation in its entire cross-section, a small diameter laser beam is traversing the entire cross section in multiple parallel and usually equidistant trajectories. In general, the distance between consecutive laser passes is kept constant during the entire manufacturing process. This so-called hatch distance is defined by the laser spot size at the powder bed and by complex laser-powder interaction phenomena. For maximum productivity it is normally attempted to make best use of the available power of the energy beam.

Another important parameter is the scanning speed. It can be kept constant or variable along the scanning trajectory. These three key process parameters are mutually connected and cannot be changed arbitrarily. For example, undesired porosity appears, if the laser energy density at the powder bed is reduced too much, e.g. due to insufficient available laser power at the powder bed or too high scanning rates.

On the other side, the production rate depends significantly on secondary 'laser idle' operations, where the energy beam is switched off. Examples for such 'laser idle' steps are repositioning jumps, beam acceleration and deceleration before and after beam repositioning, or "jump", "mark" and "poly" delays, associated with movement commands for the energy beam. In particular for complex thin walled parts, where the remelting of the cross section involves a large number of short tracks and many repositioning movements of the energy beam, these delays accumulate to a significant fraction of the overall manufacturing time. Secondary 'laser idle' time also includes the application of new powder layers with its associated wait times.

For example, an SLM machine consists in general of a control unit, a laser and a laser beam focusing and optical beam shaping system, an isolated work chamber with protective atmosphere, a mechanical system for powder deposition from a sealed container to the work zone. The optical laser beam shaping and beam guiding system typically consists of a beam expander, scanner head and a focusing lens. The scanner head is responsible for the laser beam positioning at selected cross-sections of the powder bed. It normally consists of two mirrors attached to two electric motors to aim the incident laser beam at the desired direction. It is desirable to tune the process parameters in a way to keep 'laser idle' time as low as possible, but it cannot be reduced to zero.

The key process step in SLM is the selective laser melting of the powder layers.

FIG. 1 shows a typical conventional algorithm of irradiating a cross-section 1 by laser beam known from the prior art. Several laser tracks 2 are equally separated from each other by a hatch distance 4. The track length 3 of the laser can be smaller, equal or larger than the width w of cross-section 1. In FIG. 1 the track length 3 is equal to the width w. FIG. 1a) and FIG. 1c) show typical unidirectional scanner paths, FIG. 1b) and FIG. 1d) show bidirectional scanner processing.

Such conventional scanning strategies are realized in the following way: The laser beam is positioned at the start (acceleration) zone 6 of the irradiation trajectory 2 (see FIG. 1c) and FIG. 1d)), the movement of the laser starts and the system switches the laser on. The focused laser beam is translated along the scanning direction on the irradiation trajectory 2. At the end of the irradiation trajectory 2, the laser is switched off, decelerated (see dotted line 7, deceleration zone) and it is then repositioned (see dotted line 8, reposition movement) to the following start point of the next laser track 2 in the linear translation direction 5. In some cases, the acceleration and deceleration zones 6, resp. 7 are made very short, or they are completely eliminated. In FIG. 1a) and FIG. 1c) adjacent laser tracks 2 are done in the same direction, in FIG. 1c) and FIG. 1d) adjacent laser tracks 2 are done in opposite directions.

It can be clearly seen, that the irradiation process consists of the selective laser melting step (shown by the arrows 2) and secondary 'laser idle' operation steps (shown by the dotted arrows 6, 7 and 8).

The later ones are one explanation for a major obstacle for the commercial success of those additive manufacturing processes—the low build rate.

This low build rate leads to long process times with associated high manufacturing costs and only low to moderate throughput for a serial production. For example, the manufacturing cycle of a single component of a few kg of weight can take 100 machine hours and more.

Various solutions are known to increase the production rate. Among them is the application of multi-beam technology, preheating of manufacturing area to the temperatures around 500-900° C., or the modification of the intensity distribution of laser beam.

Multi-beam technology uses multiple independent laser beams to melt the powder. Indeed, this leads to increased production rates, but it requires at the same time equivalent amount of additional investment costs.

Preheating of the powder bed is a method to decrease the amount of energy required to melt the powder material. However, the application of such methods requires additional investment costs, caused by the much more complex hardware requirements. It is also complicated by undesired secondary effects, like powder sintering in the work zone.

The application of a non-gaussian laser power density distribution in the focal plane can improve the SLM process. The negative aspect of this approach is the significant initial investments required for its application.

Document US 2012/267347 A1 describes a method for welding workpieces made of highly heat-resistant superalloys, including a particular mass feed rate of the welding filler material. The disclosed prior art method is a laser metal forming (LMF) process, which is a blown powder technique and which is used for refurbishment of damaged regions in order to restore the original wall thickness. The method described in Document US 2012/267347 A1 is therefore not a selective laser melting (SLM) process which generates new articles or parts of articles layer by layer directly from a powder bed. The method according to US 2012/267347 A1 includes generating a heat input zone on a workpiece surface by means of a heat source, feeding welding filler material into that zone by means of a feeding device, and generating a relative movement between the heat source and the feeding device on one hand and the workpiece surface on the other hand by means of a conveying device. This has the disadvantage that heavy parts, like CNC table, robot arms or laser head have to be moved. The welding pattern according to this prior art document are meandering weld lines with rounded edges.

SUMMARY

It is an object of the present invention to disclose a method for entirely or partly manufacturing a metallic or ceramic component/three-dimensional article by SLM additive manufacturing methods with an improved production rate and without a need for implementing more powerful lasers. It is also an object of the invention to disclose such a method without a need for implementing a new hardware on the SLM machine.

This and other objects are obtained by a method according to claim 1.

The core of the present invention is the application of a linear or quasi-linear 2D heat source (laser beam) instead of a point heat source for the selective melting with a reduced secondary "idle" time. The new processing strategy combines the linear translation movement of the focussed laser beam on the surface of the powder layer with superimposed high frequency sinusoidal oscillations in transverse and/or longitudinal directions. The fast oscillatory deflections perpendicular to the linear scanner path create a two-dimensional heat source profile moving on the surface of the powder layer along the original scan direction. Such a processing scheme provides a much more uniform irradiation of powder, providing optimized solidification conditions. It also minimizes 'laser idle' time due to the novel principle, which reduces the number of inevitable delays and repositioning movements at the beginning and the end of each scanning track.

It is an advantage of the disclosed method that the production rate could be increased by at least 25%. The inventive element is the sequence of the powder treatments by the high energy beam. The disclosed method maximises the productive time where laser emission is switched on. The method can be thus used to manufacture components or their elements by SLM with higher production rates compared to conventional SLM process strategies. A particular benefit is the possibility to reduce idle times and jump delays compared to conventional laser hatch scanning algorithms. The application of such new laser wobbling strategies in additive manufacturing increases the productivity of the manufacturing process and reduces costs per part. The wobble oscillation is created by a beam deflection device (galvanometer scanner, i.e. a pair of small, light-weight mirrors, which are mounted in a stationary 2D or 3D scanner device inside the workcell.) and the same beam deflection device is also used for linear positioning movement. The relative movement is produced therefore with a minimum inertia using the deflection device which allows much higher dynamics of the movements compared to known methods.

It is an advantage, if the frequency of the wobble oscillation is in the range from 10 to 50 000 Hz and the amplitude is in the range from 0.01 mm to 20 mm.

In a preferred embodiment the wobble oscillation parameters, namely the frequency and the amplitude, and the linear movement parameter are adjusted such that the linear displacement of the high energy beam during one oscillation half period is in the range from 0.01 to 2.0 times of the beam diameter at the surface of the powder bed.

The process works in a powder bed, where a whole powder layer is deposited prior to the laser processing. In the processing step the laser beam only selectively melts and solidifies the powder at certain locations.

The method can be used especially for manufacturing new, that means, not already used articles layer by layer directly from a powder bed, such as small to medium size hot gas parts and prototypes with complex design. Such parts can be found, for example in the first turbine stages of a gas turbine, in a compressor or in combustors.

Said metallic base material is one of a high-temperature Ni-based alloy, Co-based alloy, Fe-based alloy or combinations thereof.

Specifically, said alloy can contain finely dispersed oxides, specifically one of $Y_2O_3$, $Al_2O_3$, $ThO_2$, $HfO_2$, $ZrO_2$.

Components manufactured by the described method are used in the compressor, combustor or turbine section of a gas turbine, preferably as a blade, a vane, a heat shield or a combustor swirler.

BRIEF DESCRIPTION OF THE DRAWINGS

The present invention is now to be explained more closely by means of different embodiments and with reference to the attached drawings.

FIGS. 4a) to 4d) show two additional wobbling scanning strategies wherein FIG. 4a) and FIG. 4c) show unidirectional scanner paths and FIG. 4b) and FIG. 4d) show bidirectional scanner according to third and a fourth embodiment of the invention and FIG. 5 shows the configuration of the 2-dimensional wobbling heat source with longitudinal oscillations superimposed with additional transversal oscillations.

DETAILED DESCRIPTION

As described above the general idea of the described method is to use a wobble scanning strategy to produce functional elements of high design complexity by Selective Laser Melting (SLM). These additive manufacturing processes will benefit from higher production rates using the novel beam scanning technique.

A good example of such an application is a combustor swirler for gas turbines, where many cross sections of large size have to be molten by the laser beam. The manufacturing of such components requires usually many machine hours. A significant part of the overall manufacturing time, however, is 'laser idle' time, i.e. secondary "non-melting" operations, where the laser is switched off and thus non-productive. Typical examples are the deposition of new powder layers but also laser repositioning movements from the end of one melting track to the start of the subsequent melting track with their associated laser on/off delays. A significant fraction of this 'laser idle' time can be eliminated by the application of the disclosed wobble scanning strategy, leading to faster manufacturing rates.

FIGS. 2 to 5 show different embodiments of the disclosed invention. With the described new scanning strategy secondary 'laser idle' operations can be avoided.

Figures 1A, 1B, 1C, 1D:
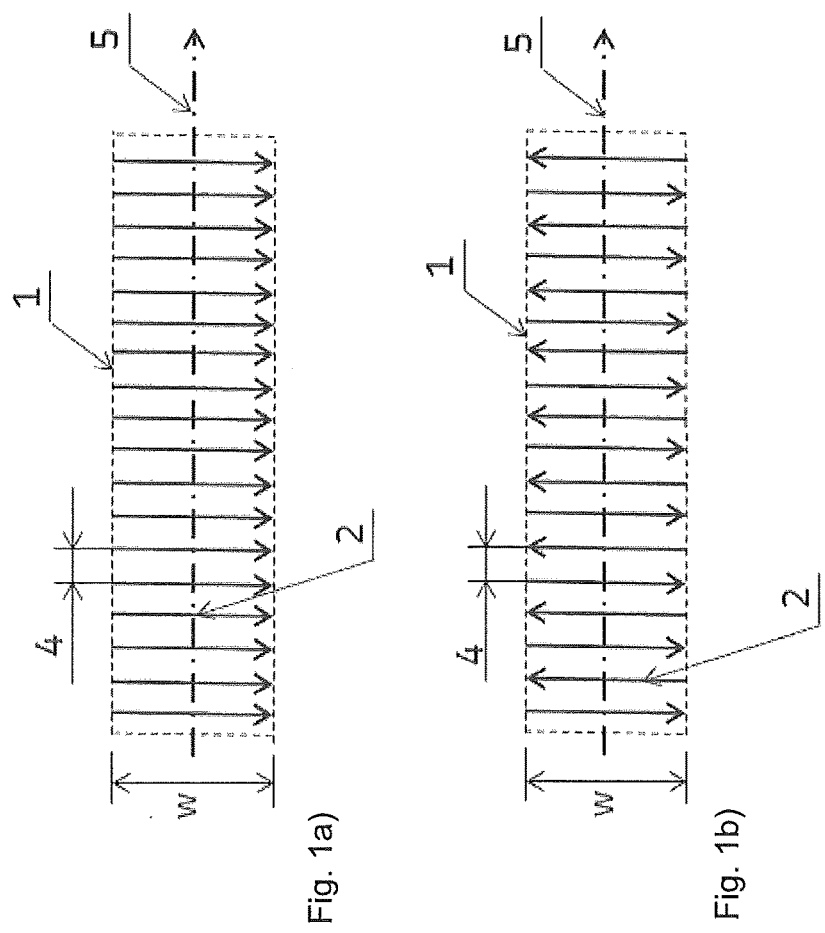
FIGS. 1a) to 1d) show a conventional algorithm of irradiating a cross-section by a laser beam according to the prior art, wherein FIG. 1a) and FIG. 1c) show typical unidirectional scanner paths and FIG. 1b) and FIG. 1d) show typical bidirectional scanner paths.
Figure 2:
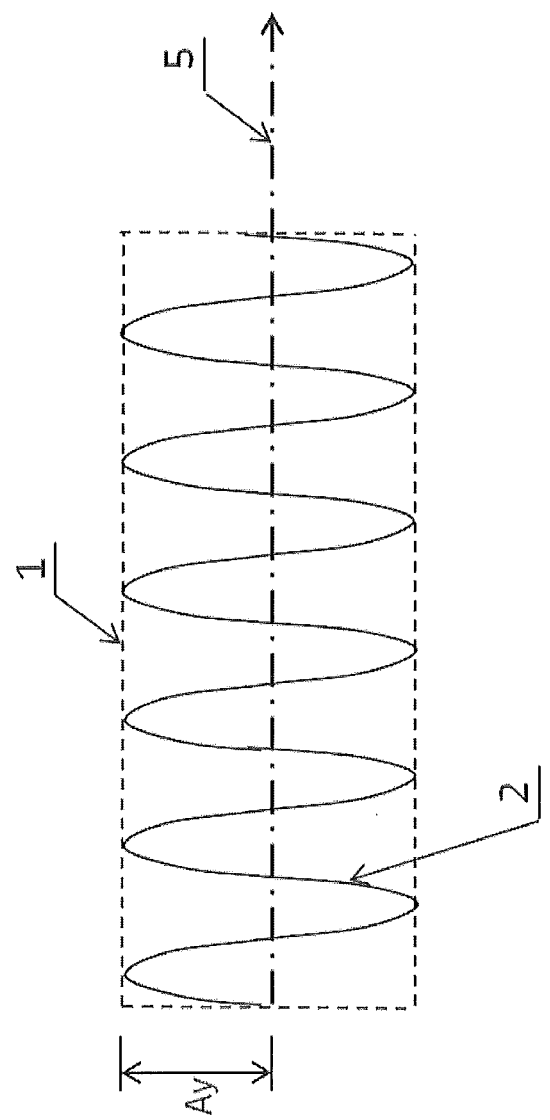
FIG. 2 shows a first basic principle of an oscillating heat source according to a first embodiment of the invention.
Figure 3:
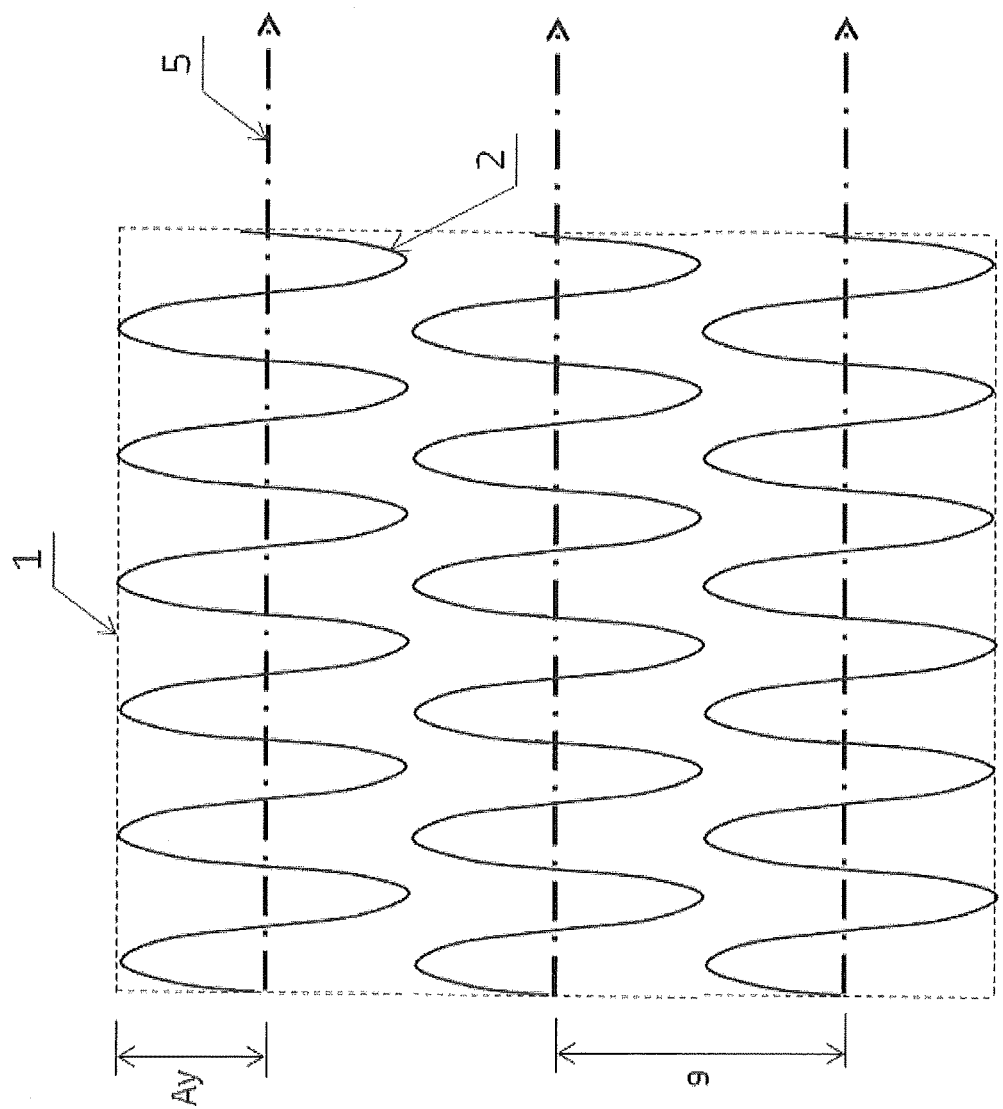
FIG. 3 shows a second basic principle of an oscillating heat source with a lateral offset according to a second embodiment of the invention.

In FIG. 2 and FIG. 3 is shown that the linear translation movement 5 of the focused laser beam 2 on the surface of a powder layer (cross section 1) is combined with superimposed sinusoidal high frequency (10-50000 Hz) oscillations in transverse and/or longitudinal directions. These transverse and/or longitudinal oscillations typically have amplitudes Ay of 0.01 to 20 mm. The fast oscillatory deflections perpendicular to the linear scanner path create a quasi two-dimensional heat source profile moving on the surface of the powder layer along the original scan direction. Such a processing scheme provides a much more uniform irradiation of powder, providing optimized solidification conditions. It also minimizes 'laser idle' time due to the disclosed principle, which reduces the number of inevitable delays and repositioning movements at the beginning and the end of each scanning track.

Material specific configurations of oscillation-translation scanning parameters can be arranged for all cross-sections with lateral offset 9, shown in FIG. 3. The lateral offset is typical equaling approx. 0.5-3 times the amplitude Ay of the oscillation. FIG. 4 shows two principles of oscillating scanning strategies arrangement in a cross section wherein FIG. 4a) and FIG. 4c) show unidirectional scanner paths and FIG. 4b) and FIG. 4d) show bidirectional scanner paths according to a third and a fourth embodiment of the invention. FIG. 4 describes the possible principle of parallel arrangement of scanning tracks. Propagation along 5 with certain fixed traverse speed, amplitude Ay and frequency Fy is consequently repeated along the traverse direction 10 with a hatch distance 4.

Unidirectional case, described in FIG. 4a) and FIG. 4c), uses constant linear translation direction, but requires certain idle time for repositioning 8. Bidirectional case, described on FIG. 4b) and FIG. 4d), uses alternating linear translation direction and provide minimum amount of idle time. In these two additional embodiments of the invention the laser beam oscillations 2 create a quasi-linear heat source, instead of the point heat source, which is typical for the conventional scanning.

The oscillations of the laser beam avoid undesirable heat accumulation or overheating. Moreover, due to the larger dimensions of the quasi-linear heat source, the hatch distance 4 can be significantly increased, which reduces the number of repositioning movements (and thus laser idle time) per unit area to be scanned.

Figure 5:
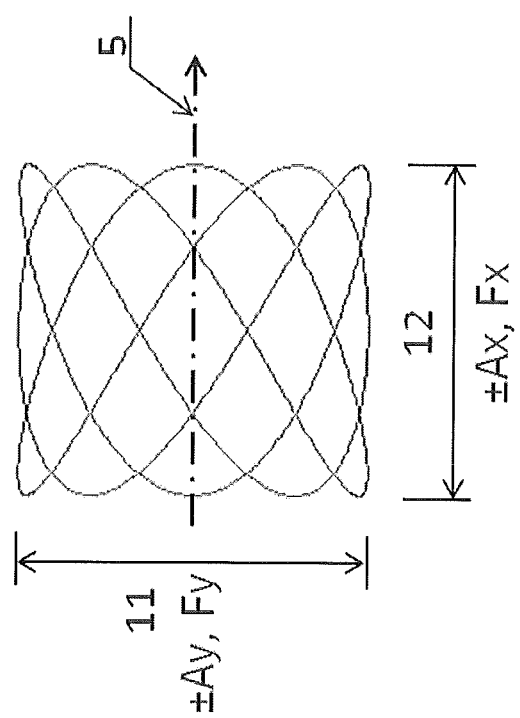

A very general case of a quasi-2D heat source with adjustable intensity distribution is illustrated in FIG. 5, which shows the configuration of the 2-dimensional oscillating heat source. In this case additional longitudinal oscillations are superimposed with the transversal oscillations. The irradiation profile is generated by longitudinal oscillations 12 of the focused laser beam with frequency Fx and amplitude Ax superimposed with transversal oscillations 11 characterized by frequency Fy and amplitude Ay. This results in a quasi-2D oscillating heat source, moving along direction 5. The intensity distribution of this 'quasi-2D' oscillating heat source can be adapted to the requirements of the process by modifying oscillation parameters Fx, Ax, Fy and Ay.

The method according to the present invention leads to a more favourable interaction between the energy beam and powder material. High frequency oscillations of laser beam in transversal and/or longitudinal direction act like a pulsed heat source from the powder particle point of view. Such interactions reduce the surface temperature of the heated powder and enlarge the interaction time with the laser beam. The oscillating linear heat source provides more favorable conditions for heat dissipation in the area where powder is remolten. Due to the limited thermal diffusivity in the powder bed and the combination of suitable wobble oscillation amplitudes and wobble frequencies, there is only a small dissipation of the thermal energy provided by the energy beam during one half period of the oscillation. Therefore, the energy beam encounters preheated powder, when it returns in the following half period close to its previous position. This makes it possible to re-use the thermal energy in the following powder material remelting.

It does also give additional advantages from a technological point of view: During conventional processing with a high-intensity beam ($10^4$-$10^6$ W/mm$^2$) with centro-symmetrical intensity profile, strong temperature gradients are created in the liquid melt pool generating intensive hydrodynamic fluxes. Processing at high beam intensity often leads to an overheating in the center of the beam causing evaporation of the powder material and/or spark formation. Vapor or splash formation are undesired consequences of the high-power laser processing as the incident beam intensity may interact with the vapor plume leading to partial absorption of the energy beam. It is normally attempted to remove the vapor plume from the interaction zone by an efficient Argon cross-jet. However, there is often a position dependency in the efficiency of the cross-jet, which can lead to non-uniform quality of parts built at different positions of the substrate plate. Part quality may suffer in areas, where the cross jet is less efficient and where the incident energy beam is partially absorbed by the plume of evaporated material. The proposed scanning strategy with a 'quasi-linear' or 'quasi-2D' oscillating heat source avoids temperature peaks in the melt pool due to the more favorable pulsed-like heat input, which reduces the risk of local overheating of the melt pool and powder evaporation. Less material is evaporated, avoiding the undesired attenuation of the incident energy beam and deposits on the optical components. The disclosed linear heat source not only increases production rate by eliminating idle times, but also additionally increases production rate by means of different laser-powder interaction phenomena. The technique can be applied for the manufacturing of various metal, plastic and ceramic objects, using selective laser melting machines.

The proposed method for additive manufacturing by selective laser melting a three-dimensional metallic or ceramic article/component entirely or partly, comprising the steps of successively building up said article/component layer by layer directly from a powder bed of a metallic or ceramic base material by means of remelting the layers with a high energy beam, moving repetitively across the areas, which are to be solidified, wherein the movement of the energy beam is made of a superposition of a continuous linear movement and at least one superimposed wobble oscillation with a frequency (F) and an amplitude (A), wherein the wobble oscillation (sinusoidal) is created by a beam deflection device (galvanometer scanner) and the same beam deflection device (scanner) is also used for linear positioning movement.

The oscillating movement in the disclosed method is so fast that there can be a substantial overlap in the successive passes of the laser beam. As a consequence, the material remains in the liquid state during successive passes of the laser beam, creating a line shaped (or rectangular/elliptical) shaped melt pool. The temperature in this zone remains above the liquidus temperature during several passes of the laser beam. The process region (melt pol) undergoes fast temperatures oscillations that are synchronous to the passes of the laser beam. Only after several passes of the laser beam the temperature in this region drops below the solidus temperature and the material solidifies.

More than one oscillation movement can be superimposed to the linear movement according to the present application. As an example, two orthogonal oscillations of the laser beam result in co-called "Lissajous curves", creating quasi-square or rectangular intensity patterns (see FIG. 5).

Said powder-based additive manufacturing technology may be used to build up a new article, such as a blade or vane of a gas turbine, entirely or partly, e.g. blade crown build up. The article could also be an insert or a coupon used for example for repair processes of a whole component.

When said high temperature material is a Ni-based alloy, a plurality of commercially available alloys may be used like Waspaloy®, Hastelloy® X, IN617®, IN718®, IN625®, Mar-M247®, IN100®, IN738®, 1N792®, Mar-M200®, B1900®, RENE 80®, Alloy 713®, Haynes 230®, Haynes 282®, or other derivatives.

When said high temperature material is a Co-based alloy, a plurality of commercially available alloys may be used like FSX 414®, X-40®, X-45®, MAR-M 509® or MAR-M 302®.

When said high temperature material is a Fe-based alloy, a plurality of commercially available alloys may be used like A 286®, Alloy 800 H®, N 155®, S 590®, Alloy 802®, Incoloy MA 956®, Incoloy MA 957® or PM 2000®.

Especially, these alloys may contain fine dispersed oxides such as $Y_2O_3$, $Al_2O_3$, $ThO_2$, $HfO_2$, $ZrO_2$.

In one preferred embodiment the component manufactured with the method according to the invention is a blade or a vane, a heat shield or a combustor swirler for a turbo machine. The method is applicable especially for small to medium size hot gas path parts and prototypes with complex design that are suitable for manufacture with additive powder-based SLM techniques. Such parts can be used in all current and future gas turbines. Applications in the first two turbine stages and in combustors will be in the focus.

The proposed wobble technique provides a general solution to important generic problems encountered during additive powder-based manufacturing. Key benefits are not only higher productivity, but also improved quality and stability of the process:

increased production rates for the additive manufacturing of articles meaning less machine hours per part and thus lower costs, higher part quality due to the reduction of porosity resulting from the partial absorption of beam energy by evaporated powder material, reduced variable costs for additive manufacturing due to longer intervals between exchanges of dust filters.

It can be used for the partial build-up of an article, for example a blade crown build-up on the tip of a blade airfoil, or for additive-manufacturing of the entire article/component, for example a gas turbine blade.

In addition, as a further advantage the method can be implemented on existing SLM machines of the latest generation without a hardware upgrade.

The invention claimed is:

1. A method for selective laser melting additive manufacturing a three-dimensional article/component entirely or partly, the method comprising:

successively building up an article/component layer-by-layer directly from a powder bed of a base material by remelting the layers with a high energy laser beam; and moving repetitively across the areas which are to be solidified, wherein the movement of the laser beam on a surface of the powder bed is made of a superposition of a continuous linear movement and at least one superimposed sinusoidal oscillation with a frequency and an amplitude, wherein the oscillation is created by a beam deflection device and the same beam deflection device which is also used for linear positioning movement, wherein a lateral offset between adjacent axes of the linear movement of the laser beam across the surface of the powder bed equals 0.5-3× the amplitude of the oscillation.

2. The method according to claim 1, wherein an oscillation frequency is in a range from 10 to 50 000 Hz.

3. The method according to claim 1, wherein an oscillation amplitude is in a range from 0.01 mm to 20 mm.

4. The method according to claim 1, wherein oscillation parameters, of frequency and amplitude, and a linear movement parameter, are adjusted such that linear displacement of the laser beam during one oscillation half period is in a range from 0.01 to 2.0 times of a beam diameter at a top surface of the powder bed.

5. The method according to claim 1, wherein the power bed is a metallic material.

6. The method according to claim 5, wherein said metallic material is one of a high-temperature Ni-based alloy, Co-based alloy, Fe-based alloy or combinations thereof.

7. The method according to claim 6, wherein said alloy contains finely dispersed oxides of one of Y2O3, Al2O3, ThO2, HfO2, ZrO2.

8. The method according to claim 1, wherein the power bed is a ceramic material.

9. A method for selective laser melting additive manufacturing a three-dimensional article/component entirely or partly, the method comprising:

successively building up an article/component layer-by-layer directly from a powder bed of a base material by remelting the layers with a high energy laser beam; and moving repetitively across the areas which are to be solidified, wherein the movement of the laser beam on a surface of the powder bed is made of a superposition of a continuous linear movement and at least one superimposed sinusoidal oscillation with a frequency and an amplitude, wherein the oscillation is created by a beam deflection device and the same beam deflection device which is also used for linear positioning movement, wherein oscillation parameters, of frequency and amplitude, and a linear movement parameter, are adjusted such that linear displacement of the laser beam during one oscillation half period is in a range from 0.01 to 2.0 times of a beam diameter at a top surface of the powder bed.

10. The method according to claim 9, wherein an oscillation frequency is in a range from 10 to 50 000 Hz.

11. The method according to claim 9, wherein an oscillation amplitude is in a range from 0.01 mm to 20 mm.

12. The method according to claim 9, wherein the power bed is a metallic material.

13. The method according to claim 12, wherein said metallic material is one of a high-temperature Ni-based alloy, Co-based alloy, Fe-based alloy or combinations thereof.

14. The method according to claim 13, wherein said alloy contains finely dispersed oxides of one of $Y_2O_3$, $Al_2O_3$, $ThO_2$, $HfO_2$, $ZrO_2$.

15. A method for selective laser melting additive manufacturing a three-dimensional article/component entirely or partly, the method comprising:

successively building up an article/component layer-by-layer directly from a powder bed of a base material by remelting the layers with a high energy laser beam; and moving repetitively across the areas which are to be solidified, wherein the movement of the laser beam on a surface of the powder bed is made of a superposition of a continuous linear movement and at least one superimposed sinusoidal oscillation with a frequency and an amplitude, wherein the oscillation is created by a beam deflection device and the same beam deflection device which is also used for linear positioning movement, wherein the power bed is one of a high-temperature Ni-based alloy, Co-based alloy, Fe-based alloy or combinations thereof, and said alloy contains finely dispersed oxides of one of $Y_2O_3$, $Al_2O_3$, $ThO_2$, $HfO_2$, $ZrO_2$.

16. The method according to claim 15, wherein an oscillation frequency is in a range from 10 to 50 000 Hz.

17. The method according to claim 15, wherein an oscillation amplitude is in a range from 0.01 mm to 20 mm.

* * * * *